United States Patent [19]
Montel

[11] 3,893,119
[45] July 1, 1975

[54] DISTANCE MEASURING APPARATUS INTEGRATED IN AN AIRCRAFT LANDING SYSTEM OF THE ILS TYPE

[75] Inventor: Gilbert Montel, Palaiseau, France

[73] Assignee: Agence Nationale de Valorisation de la Recherche "Anvar", France

[22] Filed: Sept. 20, 1973

[21] Appl. No.: 399,092

[30] Foreign Application Priority Data
Sept. 20, 1972 France .............................. 72/33283

[52] U.S. Cl. .......................... 343/108 R; 343/112 D
[51] Int. Cl. .............................................. G01s 1/16
[58] Field of Search .................... 343/108 R, 112 D

[56] References Cited
UNITED STATES PATENTS
3,760,419 9/1973 Poschadel et al. .............. 343/108 R
3,781,891 12/1973 Moose............................ 343/108 R FOREIGN PATENTS OR APPLICATIONS
692,812 6/1953 United Kingdom............. 343/112 D Primary Examiner—Maynard R. Wilbur
Assistant Examiner—Richard E. Berger
Attorney, Agent, or Firm—Craig & Antonelli

[57] ABSTRACT

Distance measuring apparatus integrated in an aircraft landing system of the ILS type which utilizes the differential measuring technique wherein a deviation signal is alternately applied and suppressed to a network of lateral aerials of a glide station. The distance measuring apparatus measures the bearing angle of the approaching aircraft with respect to the glide station, and includes at the glide station a pair of lateral aerials associated with the low aerial of the glide station arranged for intermittently emitting side bands corresponding to the modulation of the glide signal at a low frequency which is sufficiently high with respect to the conventional ILS frequencies of 90 and 150 Hz, for example, 960 Hz. On board the aircraft, the distance measuring apparatus includes distance indicating devices connected to the low frequency output of a conventional ILS receiver for providing a distance indication in accordance with the variation in the degree of modulation of the 960 Hz signal received by the ILS receiver.

10 Claims, 3 Drawing Figures

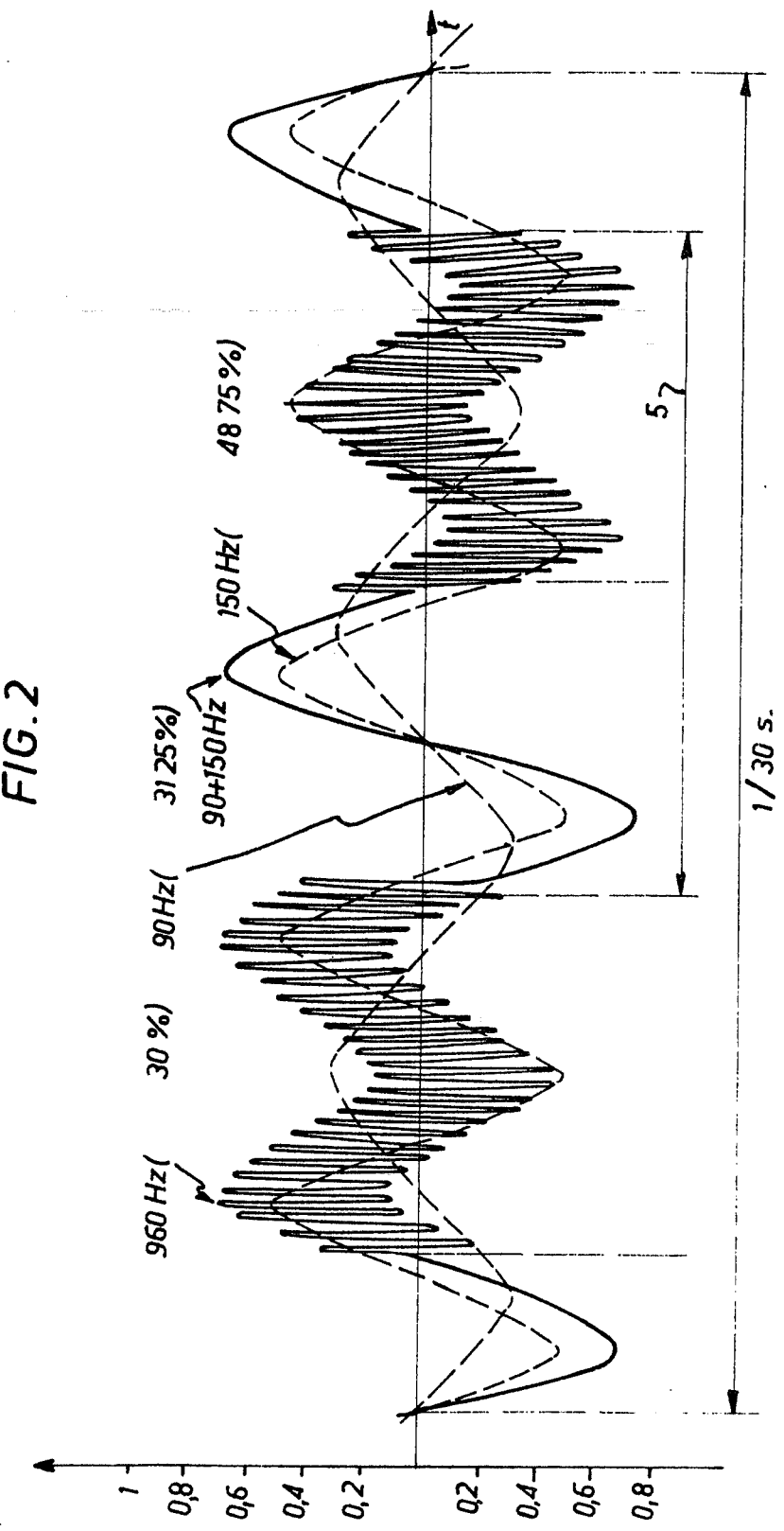

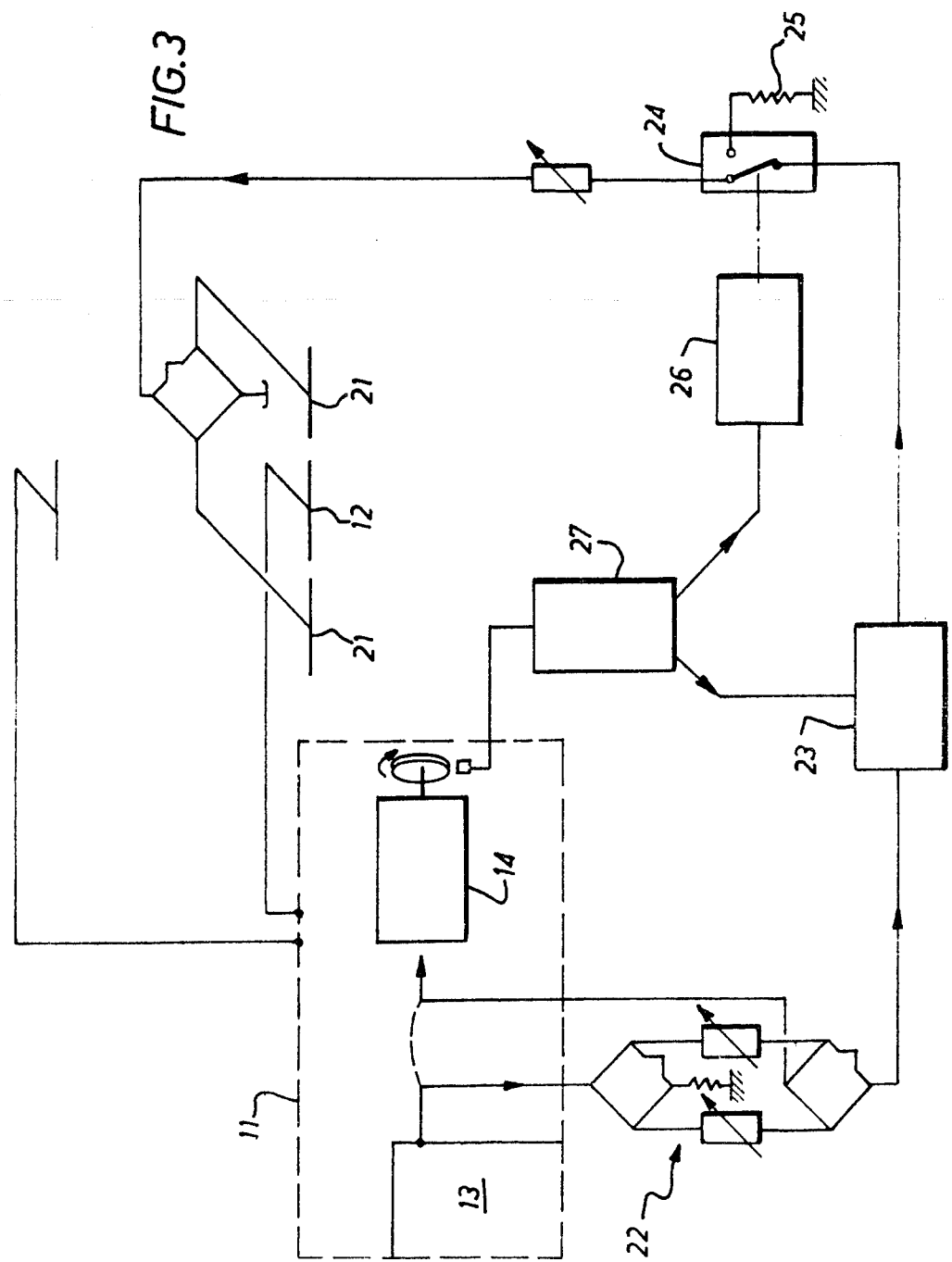

DISTANCE MEASURING APPARATUS INTEGRATED IN AN AIRCRAFT LANDING SYSTEM OF THE ILS TYPE

The system for the radio guidance of aircraft towards aircraft runways, which is known under the name of I. L. S. (Instrument Landing System) and with which the major airports of the world are equipped, comprises a runway alignment radio beacon referred to as a "LOCALIZER", a descent alignment radio beacon referred to as a "GLIDE PATH" and two or three beacons referred to as "MARKERS".

These radio beacons emit a carrier wave. The first beacon in metric wave frequency and the second in decimetric wave frequency, while applied to the carrier wave are two low-frequency modulations, one at 90 Hz and the other at 150 Hz, the degrees of modulation of which are variable as regards bearing on respective sides of the runway alignment for the LOCALIZER, and as regards angle to the horizontal, above and below the descent alignment for the GLIDE PATH, each of these alignments being defined by a state of equality between the two modulations.

For this purpose, in their most widespread version, referred to as the "null reference" version, each of the radio beacons emits, from a central aerial, a reference signal which comprises a carrier wave modulated at 90 and 150 Hz with the same degree of modulation and, from a network of lateral aerials which has a diagram of symmetrical radiation on respective sides of the beaconmarked axis and has a field zero on said axis, a deviation signal formed by the lateral 90 and 150 Hz bands. Alignment can thus be defined as the locus of the points in space at which no deviation signal is received.

It has already been proposed, in French Pat. No. 1,542,534 and entitled "Radio Guidance System with Automatic Error Compensation", for eliminating certain defects in the system (for example centering errors and interference caused by undesirable emissions), that use should be made of a differential measuring technique, the principle of which can be briefly recalled as follows:

Instead of being transmitted continuously, the deviation signal is alternately applied to the lateral network and then suppressed by means of a very low-frequency switching means so that a movable station in the vicinity of the alignment receives alternately, at the switching frequency, a modulated signal which is representative of its deviation from the alignment and then a reference signal, whereby the movable station can effect a differential measurement which removes some causes of error. The latter include centering errors, that is to say those which show that the receiver can indicate a nonzero deviation in response to an ILS signal with equal degrees of 90 and 150 Hz modulation, or that the ground installation emits a reference signal which has unequal degrees of modulation; also included are errors due to interferences which can be caused by undesirable emissions which have no reason to be cut out or chopped at the switching frequency.

French Pat. No. 2,093,394 entitled "Landing Systems Derived From the Normal System Referred to as ILS, With Monitoring Devices" has already proposed uses of the above-mentioned differential measuring technique, which has been improved in accordance with the following basic concept:

Measuring the differential deviation, that is to say, the deviation determined by the differential measuring process, does not involve the existence of two modulation frequencies. In fact, the conventional measurement of a difference in degree of modulation (DDM in English-language terminology) can be replaced by a comparative measurement between the values assumed successively by a single parameter. For example, the deviation with respect to alignment can be determined by comparing the values of the degree of 90 Hz modulation which are obtained successively upon reception of the reference signal on the one hand and the complete signal (reference signal + deviation signal) on the other hand.

The distance measuring means integrated in the I L S in accordance with the invention comprises another application of the above-mentioned differential measuring technique.

Although the marker beacons already provide distance data at two and even three characteristic moments, the need for continuous distance data during the ILS approach has for a long time now already been expressed by the crews.

In consequence, the aim of the invention is a system which permits:
- delivery on board of distance information which is "superimposed" on the conventional angular data, without necessitating the attribution of a supplementary frequency,
- in a simple manner, that is to say, by involving only modifications or additions of limited substance both as regards the ground station and as regards the equipment on board,
- in a compatible manner, that is to say, such that the modified ground station can still be used without penalty by conventional on-board equipment and that the on-board equipment necessary for distance measurement is reduced to the addition of an optional "black box" associated with the conventional receiver, the operation of which is in no way disturbed thereby.

The invention will now be described with reference to the accompanying drawings which are given by way of nonlimitative examples:

FIG. 2 is a graph of time and amplitude showing how the distance data can be superimposed on the conventional signal of the glide path;

FIG. 3 is a block circuit diagram showing the modifications to be made in accordance with the invention to the ground station;

Figure 1:
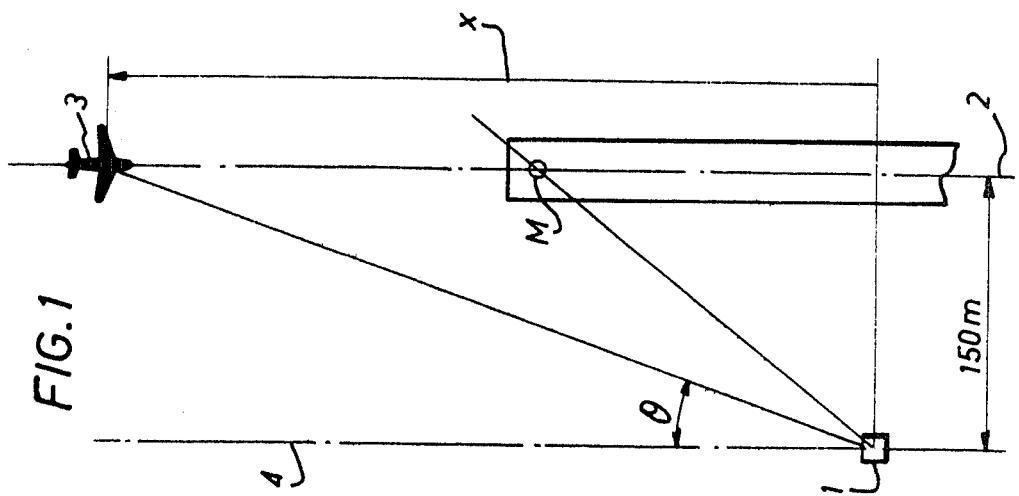
FIG. 1 is a diagrammatic plan view showing considerations of elementary geometry relating to the invention.

Referring to FIG. 1, the eccentric position of the glide station 1 relative to the axis 2 of the runway is used to convert the measurement of the bearing angle $\theta$ at which the glide station 1 sees the aircraft 3 in its approach to the distance $X$ of the aircraft 3.

Obviously, from the beginning, such a measurement can only be valid if the aircraft 3 is aligned on the axis 2 of the runway.

In accordance with the invention, to measure the bearing angle $\theta$, there is formed an elementary localizer by associating a pair of lateral aerials with the low aerial of the conventional null reference glide station.

The origin selected for the bearing angles is the line 4 parallel to the axis 2 of the runway and passing through the glide station 1, so that the most precise angle measurements are made at a long distance from the touchdown point, where the angle-distance conversion is the most sensitive.

The elementary localizer causes increasing degrees of modulation to correspond to bearing angles which increase from 0° (aircraft at infinite distance) to a maximum value of some 30° (aircraft at the threshold of the runway). This maximum value cannot in any case exceed 90° since on the one hand the signal transmitted by the glide station is problematical behind the station and seriously distrubed on the transverse direction and that on the other hand the on-board aerial is also directional and often more or less "blind" in the rearward sector.

Therefore the integrated distance measuring invention according to the invention could be used neither while going round nor during taxying.

The application according to the ivention of the above principle encounters a number of difficulties:

Firstly, as the conventional measurement of angle to the horizontal rests on a comparison between the two degrees of 90 and 150 Hz modulation, if it is desired that these modulations should carry supplementary distance data, it is not necessary under any circumstances to modify the value of the DDM (Modulation difference). The elementary localizer can therefore not operate in conventional manner, unless it does so at a frequency which is different from that of the glide station, which therefore also requires the use of the supplementary on-board receiver; and these are constraints from which precisely the invention aims to be liberated.

Secondly, the signal transmitted by the glide station is already modulated at a substantial degree, close to 75% on the descent alignment, by the conventional 90 and 150 Hz signals. The introduction of the distance data must therefore not result in a substantial increase in the degree of modulation.

The above-mentioned differential measuring technique makes it possible easily to overcome the difficulties:

In accordance with this technique, determining the deviation relative to the reference axis is no longer based on relative measurement of two degrees of modulation, but on the comparison of the values assumed successively by a single degree of modulation from one interval of the differential cycle to the other.

In accordance with the invention, a modulation frequency is arbitrarily selected in the pass band of the low-frequency amplifier of the conventional receivers, and assigned to distance measurement. In a first analysis, a frequency is selected which is easy to generate from the modulator of the ground station, which is sufficiently high to "carry" the side band resulting from chopping, without raising problems of filtering, and which is separate from the various combinations between the harmonics of 90 and 150 Hz, say for example a frequency of 960 Hz.

The glide frequency can thus "carry" the additional distance data, which overcomes the first difficulty.

However, with the above-mentioned differential measuring technique, the presence of the supplementary modulation is intermittent.

Now, the degree of modulation of the carrier is fixed by the peak value of the signal resulting from the sum of the different low-frequency components. Taking account of the range of the sum of 90 + 150 Hz (which is variable according to the elevational angle of the aircraft), it is possible in accordance with the invention to introduce a supplementary modulation which attains some 40%, but intermittently only, without causing an increase in the peak value of the sum signal and therefore the degree of modulation; this is clearly apparent from the graph shown in FIG. 2 (in which the times are given in the abscissae and the amplitudes in ordinates), in which the differential cycle is represented as having a duration 5.

The duration 5 of the differential cycle is then fixed at one-sixty second or at a multiple of this value.

In this way there is achieved multiplexing of the conventional components 90 and 150 Hz with the 960 Hz, chopped at the rhythm of the differential cycle, which overcomes the second difficulty in the same stroke.

On board, the angular deviation with respect to the reference axis is obtained by measuring the degree of modulation at 960 Hz or more precisely by measuring the variation in the degree of modulation of the 960 Hz frequency from one interval of the differential cycle to the other.

The ambiguity as regards the direction of the deviation relative to the reference axis is obviously without disadvantage.

In addition, the elementary localizer benefits from the advantages of differential measurement, namely eliminating centering errors and some protection from undesirable emissions.

From the foregoing description, the data supplied by the distance measuring means are valid in the degree that the aircraft is aligned on the axis of the runway.

The distance data is available on board as far as a point M which is positioned before touch-down (FIG. 1), and it is preferably that this point should not be positioned substantially after the entry end of the runway, so as to limit the sector of cover of the elementary localizer and consequently the danger of disturbed signal transmission.

In a first approximation the distance measuring means according to the invention must be capable of measuring bearing angles which are from 0° to 20° approximately.

FIG. 3 is a block diagram showing the modifications to be made to the ground station, in accordance with the invention. The ground station 11 of the null reference type is known, with its low aerial 12, its emitter 13, its low-frequency 90/150 Hz generator 14, and will not be described in further detail. In accordance with the invention two lateral aerials 21 which are spaced by approximately 1 λ are positioned on respective sides of the aerial 12; they are preferably more directional than the aerial 12 and they are best oriented by seeking to attain an optimum variation in the degree of 960 Hz modulation, in dependence on bearing and the reduction in parasitic reflections. The modifications according to the invention comprise:

taking off a small fraction of the carrier energy supplied by the emitter, by means of a power divider 22;

generating the 960 Hz side band by means of a static device 23 which can supply without difficulty a signal with a squared envelope and which can be of a highly simplified form;

operating a static switching means 24 which switches the 960 Hz sidebands alternately to the pair of lateral aerials 21 and to a load 25, in the rhythm of the differential cycle. The switching means 24 is actuated at 26 from the motor of the generator 14 for generating the side bands 90 and 150 Hz, through an electronic shaper 27;

the installation of a monitoring device (not shown) for monitoring the function of the distance measuring means, which can necessitate a supplementary field detector which is implanted for example in the direction of the entry end of the runway.

Figure 4:
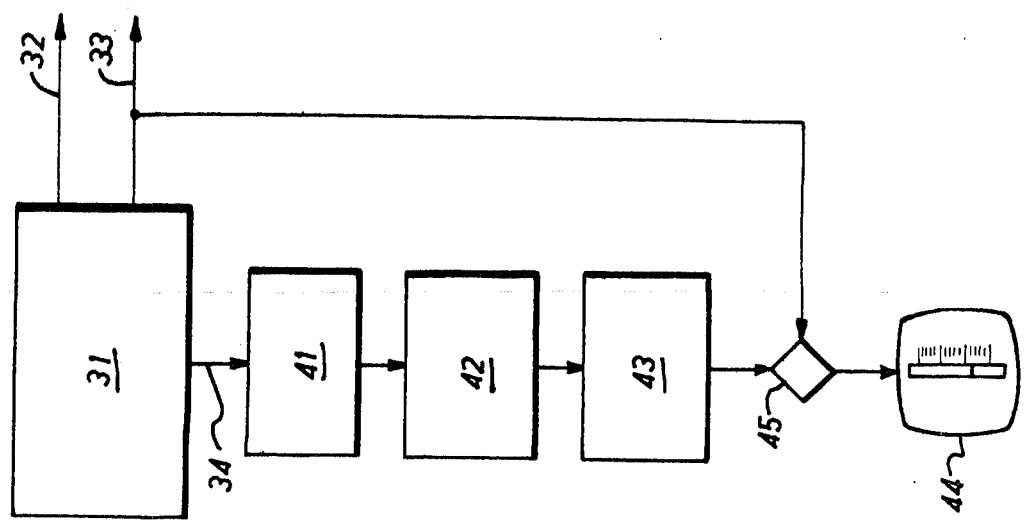
FIG. 4 is a block circuit diagram of the additional device to be provided on board in accordance with the invention.

FIG. 4 shows a block circuit diagram illustrating the additional device to be mounted on board in accordance with the invention. The conventional ILS receiver 31, besides its conventional outputs 32 (I glide deviation) and 33 (I localizer deviation) supplies at an output 34 a composite signal, as shown in FIG. 2, issuing from its low-frequency train. In accordance with the invention the 960 Hz signal which is cut off or chopped at 60 Hz is filtered at 41, then the 60 Hz frequency is detected at 42 and its amplitude, which is representative of the bearing angle, is measured at 43 and displayed by a distance indicator 44, contingent upon validation 45. The deviation current 33 of the localizer receiver is used to validate the distance information only when the aircraft is within a corridor equivalent to 20 μA for example on respective sides of the runway alignment.

It will be noted that the invention makes it possible to provide at low cost a distance measuring means which is integrated in the ILS and which operates on the same frequency as the glide station and in a manner which is compatible with the equipment which is at present in use. The integrated distance measuring means is capable of supplying during approach data whose precision increases as the aircraft approaches the point of touch-down. The quality of the distance measurement is obviously largely dependent on the aircraft being well aligned with the runway.

I claim:

1. Distance measuring apparatus integrated in an aircraft landing system of the ILS type utilizing the differential measuring technique wherein a deviation signal is alternately applied and suppressed to a network of lateral aerials of a glide station, the distance measuring apparatus measuring the bearing angle of the approaching aircraft with respect to the glide station when the aircraft is on the glide path and comprising at the glide station a pair of lateral aerial means operatively associated with the low aerial of the glide station and intermittently emitting sidebands corresponding to the modulation of the glide signal at a low frequency which is sufficiently high with respect to the conventional ILS frequencies of 90 and 150 Hz, and distance means connected to the low frequency output of a conventional ILS receiver on board the aircraft for providing a distance indication in accordance with the variation in the degree of modulation of the low frequency signal received by the ILS receiver.

2. Distance measuring apparatus according to claim 1, wherein the low frequency is 960 Hz.

3. Distance measuring apparatus according to claim 2, wherin the pair of lateral aerial means include two lateral aerials spaced apart by approximately 1 λ on respective sides of the low aerial and being more directive than the low aerial.

4. Distance measuring apparatus according to claim 2, wherein the glide station includes emitter means for providing the carrier energy and first generator means for generating 90 and 150 Hz side bands, the pair of lateral aerial means including two lateral aerials, power divider means connected to the emitter means for removing a small portion of the carrier energy furnished thereby, second generator means for generating the lateral 960 Hz bands connected to the power divider means, and static switching means responsive to the first generator means for controlling the supply of the output of the second generator means to the two lateral aerials.

5. Distance measuring apparatus according to claim 4, further including means for monitoring the operation of the two lateral aerials.

6. Distance measuring apparatus according to claim 2, wherein the distance means on board the aircraft includes a 960 Hz filter means connected to the low frequency output of the ILS receiver, detector means connected to the output of the filter means for detecting at least one of a 60 Hz signal and a multiple of a 60 Hz signal and providing an output indicative thereof, measuring means for measuring the amplitude of the detected signal, and indicator means for providing a distance display of the output of the measuring means.

7. Distance measuring apparatus according to claim 6, further including validating means connected to the output of the measuring means and an output of the ILS receiver for validating the output of the measuring means in accordance with the deviation current of the localizer signal of the ILS receiver, the validating means providing a validated measuring means output signal to the indicator means.

8. Distance measuring apparatus according to claim 4, wherein the distance means on board the aircraft includes a 960 Hz filter means connected to the low frequency output of the ILS receiver, detector means connected to the output of the filter means for detecting at least one of a 60 Hz signal and a multiple of a 60 Hz signal and providing an output indicative thereof, measuring means for measuring the amplitude of the detected signal, and indicator means for providing a distance display of the output of the measuring means.

9. Distance measuring apparatus according to claim 8, further including validating means connected to the output of the measuring means and an output of the ILS receiver for validating the output of the measuring means in accordance with the deviation current of the localizer signal of the ILS receiver, the validating means providing a validated measuring means output signal to the indicator means.

10. Distance measuring apparatus according to claim 9, wherein the two lateral aerials are spaced apart by approximately 1 λ on respective sides of the low aerial and are more directive than the low aerial.

* * * * *